US012638922B2

(12) United States Patent
Zeng et al.

(10) Patent No.: US 12,638,922 B2
(45) Date of Patent: May 26, 2026

(54) WEARABLE HAPTIC FEEDBACK DEVICE FOR HUMAN-ROBOT FORMATION CONTROL

(71) Applicant: SOUTHEAST UNIVERSITY, Jiangsu (CN)

(72) Inventors: Hong Zeng, Jiangsu (CN); Jingtian Zhang, Jiangsu (CN); Dengfeng Sun, Jiangsu (CN); Yaobing Zheng, Jiangsu (CN); Aiguo Song, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 40 days.

(21) Appl. No.: 18/779,054

(22) Filed: Jul. 21, 2024

(65) Prior Publication Data

US 2024/0402815 A1     Dec. 5, 2024

Related U.S. Application Data

(63) Continuation of application No. PCT/CN2024/079280, filed on Feb. 29, 2024.

(30) Foreign Application Priority Data

May 31, 2023     (CN) .......................... 202310640193.6

(51) Int. Cl.
G06F 3/01          (2006.01)
B25J 9/16          (2006.01)

(52) U.S. Cl.
CPC .............. G06F 3/016 (2013.01); G06F 3/011 (2013.01); G06F 3/014 (2013.01); B25J 9/16 (2013.01)

(58) Field of Classification Search
CPC ... G06F 3/00; G06F 3/01; G06F 3/016; G05B 19/42; B25J 9/00; B25J 9/0087;
(Continued)

(56) References Cited

U.S. PATENT DOCUMENTS 7,410,338 B2 *    8/2008   Schiele .............. A63B 23/1263
                                                      414/4
2014/0176452 A1   6/2014   Aleksov et al.
                           (Continued)

FOREIGN PATENT DOCUMENTS

CN          112256136          1/2021
CN          113031771          6/2021
CN          116627258          8/2023

OTHER PUBLICATIONS

Yitao Shen, "Research on Multi-Modal Interaction Technology for Human-Multi-Robot Cooperative Control," Thesis of Master Degree, Southeast University, Jun. 2021, pp. 1-87.
(Continued)

*Primary Examiner* — Van T Trieu
(74) *Attorney, Agent, or Firm* — JCIPRNET

(57)          ABSTRACT

Disclosed is a wearable haptic feedback device for human-robot formation control, including an interactive interface module and a main control module, wherein the interactive interface module includes an input module and a wearable haptics feedback module; the wearable haptics feedback module includes an extrusion force feedback module, a shear force feedback module, and a vibration feedback module, and the main control module controls each module and receives operation instructions. The device can be wirelessly deployed on an arm of a user, and provide feedback on the formation change, motion guidance, and obstacle detection of the human-robot formation by generating three haptic feedback signals: extrusion, shearing, and vibration. A haptic channel is more advantageous in providing feedback to the user on understanding capability and task situation of external limbs, which can play a unique role in reducing the difficulty of human-robot interaction and creating highly immersive operation experience for the user.

7 Claims, 4 Drawing Sheets

(58) Field of Classification Search
CPC .. B25J 9/16; B25J 9/163; A63B 23/12; A63B
23/1245; A63B 23/1263
See application file for complete search history.

(56) References Cited

U.S. PATENT DOCUMENTS

2016/0059412 A1 * 3/2016 Oleynik ................. G05B 19/42
700/250
2024/0335189 A1 * 10/2024 Wu ........................ A61B 34/30

OTHER PUBLICATIONS

"International Search Report (Form PCT/ISA/210) of PCT/CN2024/
079280," mailed on May 30, 2024, pp. 1-3.
"Written Opinion of the International Searching Authority (Form
PCT/ISA/237) of PCT/CN2024/079280," mailed on May 30, 2024,
pp. 1-5.

* cited by examiner 8
9
11
12
13
10
14

WEARABLE HAPTIC FEEDBACK DEVICE FOR HUMAN-ROBOT FORMATION CONTROL

CROSS-REFERENCE TO RELATED APPLICATION

This application is a continuation of international application of PCT application serial no. PCT/CN2024/079280 filed on Feb. 29, 2024, which claims the priority benefit of China application no. 202310640193.6 filed on May 31, 2023. The entirety of each of the mentioned above patent applications is hereby incorporated by reference herein and made a part of this specification.

TECHNICAL FIELD

The present disclosure belongs to the technical field of human-robot interaction, and particularly relates to a wearable haptic feedback device for human-robot formation control.

BACKGROUND

In recent years, research on a human-robot formation system has attracted more and more attention from scientific researchers. The human-robot formation system composed of multiple robots with relatively simple structures and functions can accomplish a task that is difficult for a single robot to complete through complementary abilities and coordinated actions of teaming members thereof. In addition, the human-robot formation system offers advantages such as good robustness and scalability.

Currently, visual feedback is a common way to convey information about the human-robot formation system to a user. However, in actual operation scenarios, the user may not receive effective feedback through a visual feedback channel due to an increase in the number of robots, high load of the visual feedback channel, visual occlusion, and the like. Therefore, visual feedback is not suitable for human-robot formation systems in actual complex scenarios.

SUMMARY

In order to solve the above problems, the present disclose provides a wearable haptic feedback device for human-robot formation control, which adopts a small wireless wearable design, all modules are worn on an arm of a slave manipulator robot of a user, and can thus generate three types of haptic force on skin surfaces of the user in a modular split manner, haptic feedback information generated therefrom can be used as an effective supplement apart from the visual and auditory perception of the user, such that the ability of the user to perceive the surrounding environment and the current conditions of the human-robot formation system is improved, and the direction guidance is provided for the user to guide the user to quickly locate the task target in a complex environment.

In order to achieve the above objective, the present disclosure adopt the following technical solution:

a wearable haptic feedback device for human-robot formation control, including an interactive interface module and a main control module;

the interactive interface module includes an input module and a wearable haptics feedback module;

the wearable haptics feedback module includes an extrusion force feedback module, a shear force feedback module, and a vibration feedback module, and the three modules are all connected to the main control module; and the main control module is connected to a core board, a Bluetooth module, and a power supply by using a mainboard, and has the functions of communicating with a host computer, and driving and controlling the three feedback modules, such that the main control module respectively controls the three modules through connecting wires, and obtains state information of a human-robot formation system through the Bluetooth module. The mainboard uses L9110S chips and ULN 2803 chips for driving 4 speed reduction motors and 25 vibration motors to work. The mainboard is provided with a Bluetooth chip interface, and a wireless control device can work through Bluetooth serial port communication; and a 18650 lithium battery supplies power to the power supply, which then provides a 7.4 V stable voltage for the main control module and the haptics feedback module.

The extrusion force feedback module is composed of servos and straps, telescopic arm bands for generating extrusion haptics feedback are connected to a rotating member, the rotating member is driven to rotate by controlling the rotation of the servos, and when tightness of the strap is controlled, different extrusion forces are generated on forearms of the user. A rotation angle of the servos and the pressure applied thereon have the following relationship:

$$N = \pi k \left( l_0 + 2R\sin\theta - \frac{R_0}{k}\sin\frac{\theta}{2} \right)$$

In the formula, N represents a magnitude of extrusion force, $\theta$ represents a rotation angle of the servos, k represents an elasticity coefficient of the straps, $R_0$ represents an original radius of the straps, and R represents radius of the arm. When the two servos rotate to tighten the straps at the same time, shrinkage of the arm bands increases the extrusion force acting on the forearms of the user. The device is configured to provide feedback on team dispersion and contraction of the human-robot formation, and provide feedback on a team size of the human-robot formation in real time through contraction force of the arm bands.

The shear force feedback module is composed of DC speed reduction motors. The four motors are fixed on arms of the user through printing members and the straps, friction wheels are installed at rotating shafts, and the motors drive rotation of the friction wheels to generate shearing force in front, rear, left and right directions on the arms of the user, so as to provide feedback on travelling direction guidance of the human-robot formation system.

The vibration feedback module is composed of a vibration motor array. 25 flat motors form an array and are fixed on a flexible circuit board, and the user fixes the array on rear ends of his/her forearms and tie the array up until he/she feels that the motors are in contact with his/her skin. Feedback on information about formation change and travelling direction of the human-robot formation in the process is provided by providing different vibration modes and motor vibration in a specific orientation.

In order to realize haptic feedback of human-robot formation system, the present disclosure follows the design principles as follows:

1. Design of Three Haptic Feedback Forms:

Compared with other sensory channels, haptic feedback has its unique advantages. Human touch is not only the most robust and widely distributed sensory channel of human beings, but also features sensitivity, bidirectionality and privacy. The wearable device provided in the present disclosure can generate three types of haptic force on skin surfaces of the user, providing four types of feedback information about the control of human-robot formation system, thereby compensating for some of the defects of visual feedback in practical applications. The system can effectively help the user perceive the surrounding environment and conditions of the human-robot formation, and provide direction guidance to guide the user to quickly locate the task target position.

Feedback information 1. team size and formation of the human-robot formation, which is executed by the extrusion force feedback module. The size of the system corresponds to a rotation scale of the servos, and when the user changes the size of the human-robot formation, the system immediately sends the corresponding servo degree to the extrusion force feedback module, and the two servos simultaneously work to retract the straps, such that the user feels the extrusion force generated by the retraction of the straps.

Feedback information 2. task direction guidance, which is executed by the shear force feedback module. The shear force feedback module can provide feedback on a relative direction and a relative distance between a parent/child target point and a user in real time, such that the user can be guided to go to the target point in sequence. Different relative directions between the parent/child target point and the user will cause the shear force feedback module to generate the shear force in different directions, and different relative distances between the parent/child target point and the user will cause different rotation speeds of the speed reduction motors in the shear force feedback module, resulting in different shear forces.

Feedback information 3. information on formation change of the human-robot formation. The vibration feedback module the array module draws different shapes on the arms of the user by using the haptic illusion phenomenon of apparent motion. Apparent motion refers to a phenomenon that when some discrete vibrating points on a skin surface of a skin vibrate according to a certain vibration duration and starting intervals, the skin of the user will perceive a sensation of continuous vibration.

Feedback information 4. information on obstacle direction, which is executed by vibration motors around the vibration feedback module; when the robots in a corresponding direction under a certain formation detects that an obstacle is entering a critical distance, the vibration motors in the corresponding direction will generate vibrations to in the corresponding direction to remind the user that the robot formation encounters an obstacle. Therefore, when concentrating on his/her attention on a front, the user can also perceive a traveling state of the human-robot formation behind him/her.

2. Lightweight Modular Design:

The main control device is integrated, and each module can be worn on the arm of the slave manipulator robot (generally the left hand) in a modular split manner, such that the user can wear and remove it conveniently, and the human-robot formation system can be connected only by turning on the power. The split design can facilitate the reduction of interference of different haptic feedbacks, and improve the efficiency of the user in distinguishing different feedbacks. When the device is worn, the user can still normally use the hand on which the device is wearing to perform various tasks, and pass the testing of the simulation environment.

3. Self-Designed Circuit and Implementing Communication:

The present disclosure adopts a self-designed circuit module connection mechanism, which is designed to connect a single-chip microcomputer core board and various modules. The circuit design includes a driving chip of each module motor, which can directly drive the motor of each module to work. At the same time, a Bluetooth communication module is provided, which can directly perform wireless serial port communication with a single-chip microcomputer chip, and control each module to respond to corresponding situation. The device provided in the present disclosure exhibits low power consumption, and can be powered by a small lithium battery module, but have a long endurance while being miniaturized.

Figure 1:
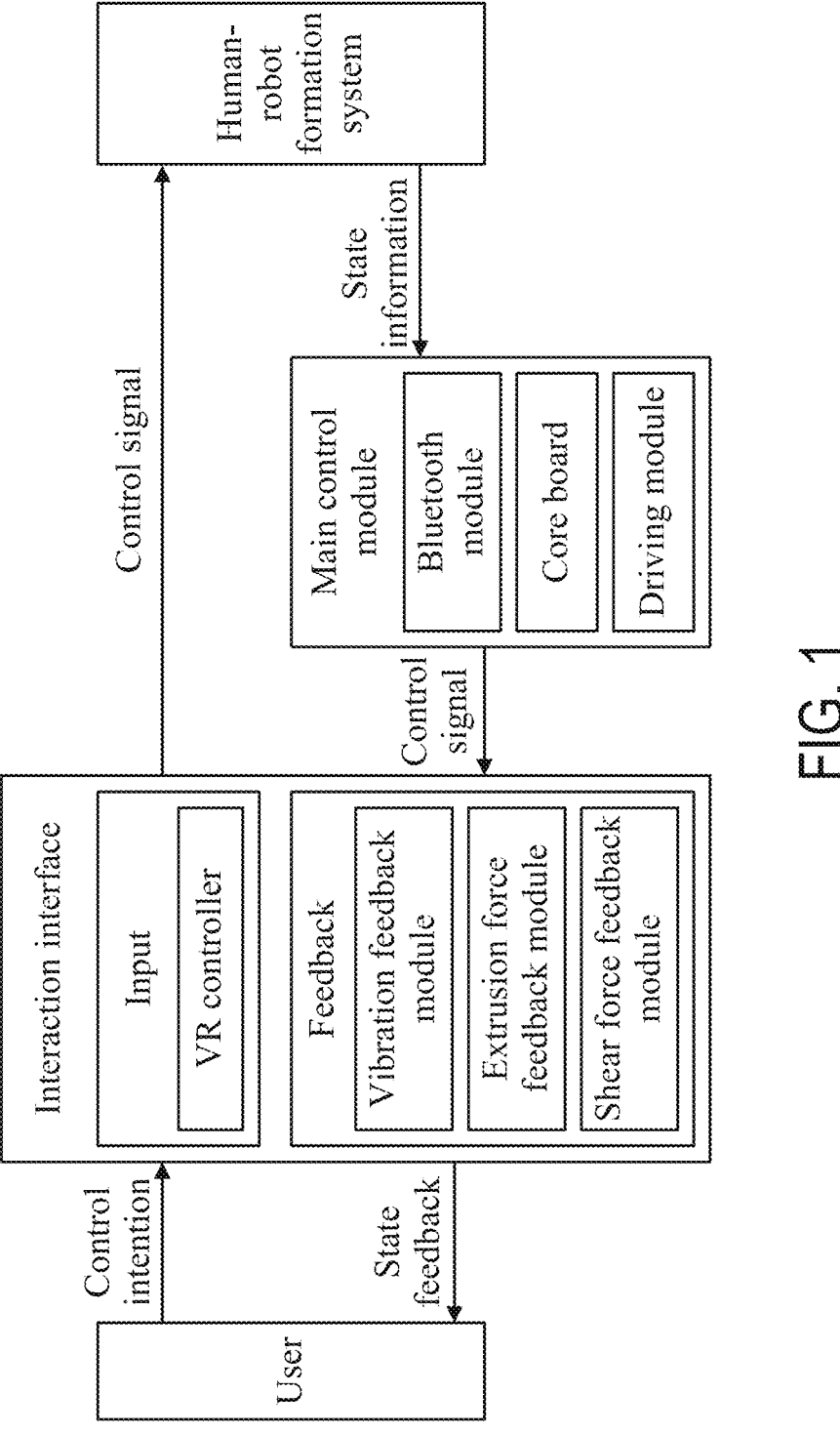
FIG. 1 is a schematic diagram of a testing system for a device in an embodiment according to the present disclosure.

Reference numerals in the accompanying drawings:

1. main control module frame; 2. Arduino core board; 3. power supply interface of main control module; 4. mainboard of main control module; 5. Bluetooth chip interface; 6. expansion interface of extrusion force feedback module and shear force feedback module; 7. expansion interface of vibration feedback module; 8. 20 Kg servo; 9. expansion board of extrusion force feedback module and shear force feedback module; 10. speed reduction motor; 11. winding reel; 12. bearing; 13. friction wheel of shear force feedback module; 14. shear force feedback module in front and back directions.

DETAILED DESCRIPTIONS OF THE EMBODIMENTS

The present disclosure will be further illustrated below with reference to the accompanying drawings and specific embodiments. It should be understood that the following specific embodiments are only used to illustrate the present disclosure, but are not intended to limit the scope of the present disclosure.

The present disclosure provides a wearable device with three haptic feedback forms based on a multi-mobile robot collaborative control system, and employs a VR controller as an instruction input interface for collaborative control of a human-robot formation; and at the same time, it combines with various force haptic information to feedback a motion state of the human-robot formation.

As shown in FIG. 1, the wearable device includes an interactive interface module, a communication module, and a main control module. The interactive interface module includes a VR controller module for inputting information, and a wearable haptics feedback module.

Figure 2:
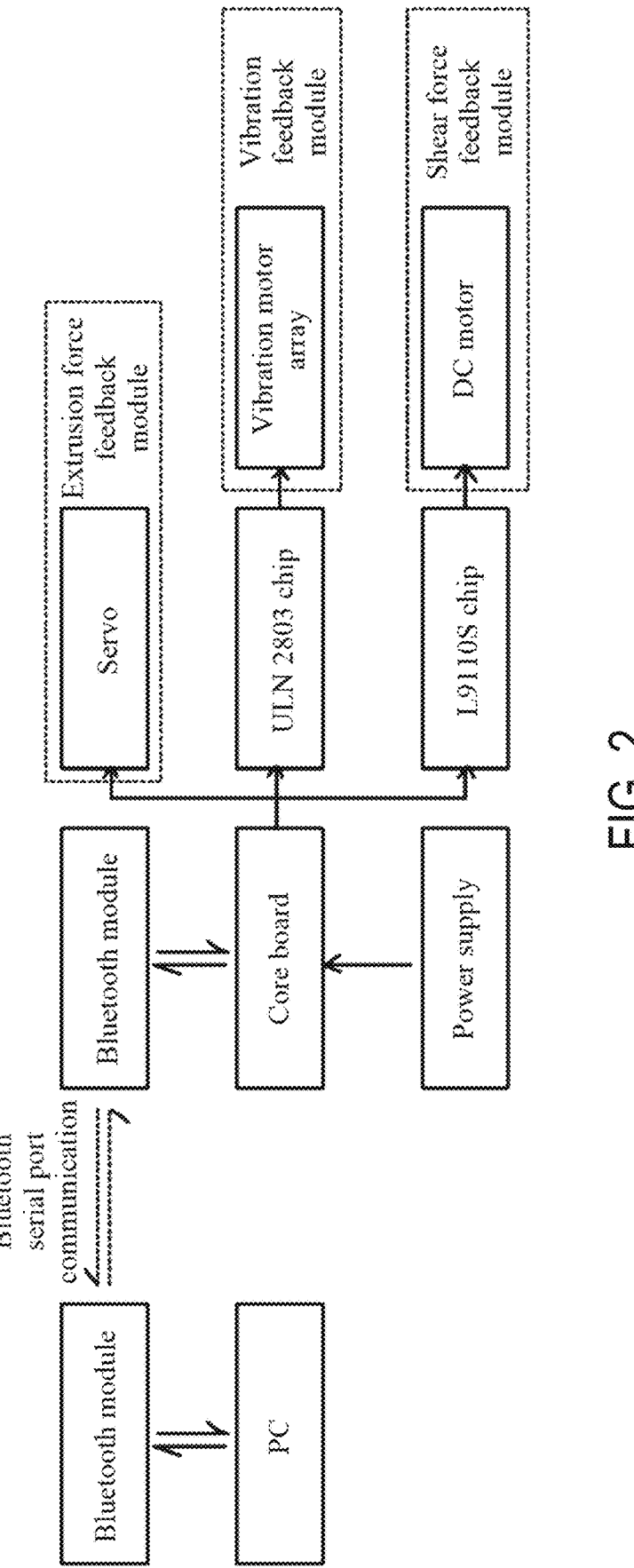
FIG. 2 is a hardware connection diagram of a device in an embodiment according to the present disclosure.

As shown in FIG. 2, the wearable haptics feedback module includes an extrusion force feedback module, a shear force feedback module, and a vibration feedback module, and the three modules are all connected to the main control module.

The main control module is connected to a core board, a Bluetooth module, and a power supply by using a mainboard, and has the functions of communicating with a host computer, and driving and controlling the three feedback modules, such that the main control module respectively controls the three modules through connecting wires, and obtains state information of a human-robot formation system through the Bluetooth module.

Figure 3:
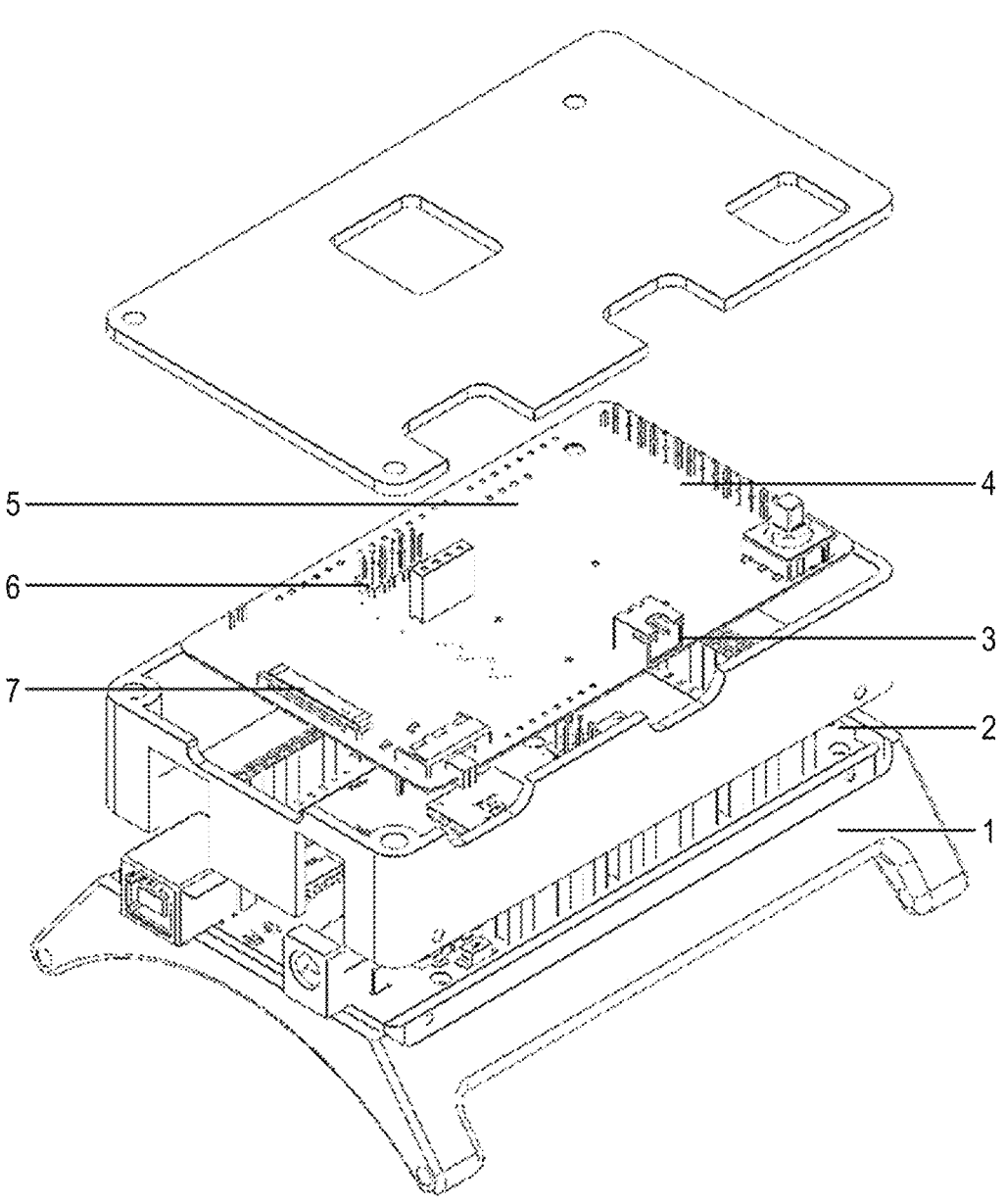
FIG. 3 is an exploded structure diagram of a main control module in an embodiment according to the present disclosure.

As shown in FIG. 3, the main control module is installed on a main control module frame 1, a main control module mainboard 4 is configured to connect an Arduino core board 2 and the power supply and to communicate with a host computer, and drive and control the three feedback modules, such that the main control module can respectively control the three feedback modules through the connecting wires. The mainboard uses four L9110S chips and five ULN 2803 chips, and connects to and drives 4 speed reduction motors and 25 vibration motors via expansion interfaces 6 and 7 to work. The mainboard is provided with a Bluetooth chip interface 5, a wireless control device can work through Bluetooth serial port communication, a 18650 lithium battery supplies power to the power supply, which then provides a 7.4 V stable voltage for the main control module, the extrusion force feedback module, and the shear force feedback module.

Figure 4:
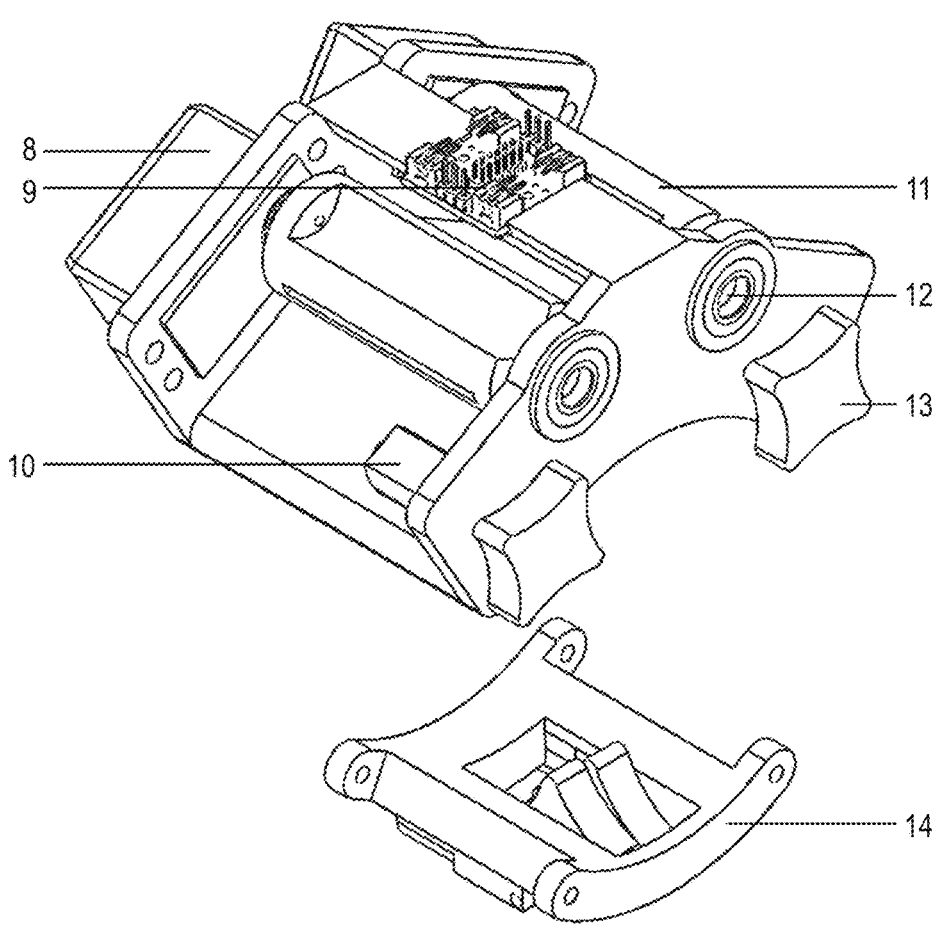
FIG. 4 is a structural schematic diagram of an extrusion force feedback module and a shear force feedback module in an embodiment according to the present disclosure.

As shown in FIG. 4, the extrusion force feedback module is composed of servos 8 and straps (not shown), telescopic arm bands for generating extrusion haptics feedback are connected to winding reels 11, and different extrusion forces are generated on forearms of the user by controlling a rotation of the servos 8. When the two servos rotate to tighten the straps at the same time, shrinkage of the arm bands increases the extrusion force acting on the forearms of the user. The device is configured to provide feedback on team dispersion and contraction of the human-robot formation, and provide feedback on a team size of the human-robot formation in real time through contraction force of the arm bands.

As shown in FIG. 4, the shear force feedback module is composed of DC speed reduction motors 10. The four motors are fixed on arms of the user through printing members and the straps, friction wheels 13 are installed at rotating shafts, and the motors drive rotation of the friction wheels to generate shearing force in front, rear, left and right directions on the arms of the user, so as to provide feedback on travelling direction guidance of the human-robot formation system.

Figure 5:
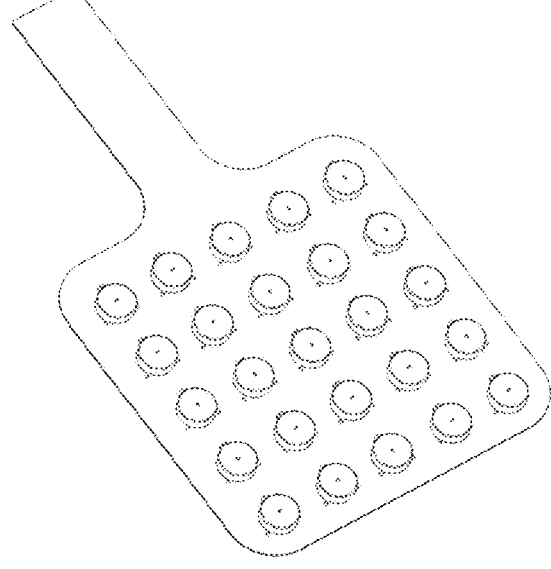
FIG. 5 is a structural schematic diagram of a vibration feedback module in an embodiment according to the present disclosure.

As shown in FIG. 5, the vibration feedback module is composed of a vibration motor array. 25 flat motors form an array and are fixed on a flexible circuit board, and the user fixes the array on rear ends of his/her forearms and tie the array up until he/she feels that the motors are in contact with his/her skin. Feedback on information about formation change and travelling direction of the human-robot formation in the process is provided by providing different vibration modes and motor vibration in a specific orientation.

The working process and principles of the present disclosure is as follows:

1. Information on the human-robot formation is obtained in real time and is transmitted to the main control module via Bluetooth wireless communication.

2. The main control module screens out valid state information of the human-robot formation system according to the received information and classifies the state information.

The state information of the human-robot formation system can be divided into four categories: the team size of the human-robot formation, the travelling direction of the human-robot formation system, the formation change of the human-robot formation, and information on an obstacle near the human-robot formation.

3. The main control module drives the corresponding feedback module according to different state information of the robot.

When the team size of the human-robot formation changes, the main control module drives the extrusion force feedback module to control the servo to rotate and tighten the straps; when a team of the human-robot formation is dispersed, contraction force of the arm bands is increased; and when the team of the human-robot formation is contracted, the contraction force of the arm bands is decreased, such that feedback on the team size of the human-robot formation can be achieved in real time;

when the travelling direction of the human-robot formation system is changed, the main control module drives the shear force feedback module to control the standby, forward rotation, reverse rotation and braking of the four motors; when the human-robot formation system sends a forward guidance instruction, the motor located on a left side of the arm runs anticlockwise, and the motor located on a right side of the arm runs clockwise, such that the user feels the shearing force applied on a skin surface of the arm towards the, providing guidance for the user to guide the robots to move forwards to some extent, and at the same time, feedback on a distance of the team of the human-robot formation relative to a target position is provided through rotation speeds of the motors;

when the human-robot formation system is subjected to the formation change, the main control module drives the vibration feedback module to control vibration motors to vibrate in an orderly manner; and when the state formation of multi-mobile robots is changed from Ti to Tj, a corresponding vibration mode is designed for each formation change state: Zd=f(Ti→Tj)(i≠j,i,j=1, 2, . . . , K); and when an obstacle is near the human-robot formation system, the main control module drives the vibration feedback module to control four vibration motors on an outer side of the vibration motor array to vibrate, such that feedback on information of the obstacle near the formation system is provided; and when an obstacle in one direction of the formation enters a critical distance, the vibration motors in the corresponding direction will vibrate to remind the user.

The present disclosure has the beneficial effects:

(1) The present disclosure adopts a real-time information feedback mechanism of the human-robot formation based on three principles of haptic feedback, haptic feedback information generated therefrom can be used as an effective supplement apart from the visual and auditory perception of the user, such that the ability of the user to perceive the surrounding environment and the current conditions of the human-robot formation system is improved, and the direction guidance is provided for the user to guide the user to quickly locate the task target in a complex environment.

(2) Compared with other sensory channels, haptic feedback has its unique advantages. Human touch is not only the most robust and widely distributed sensory channel of human beings, but also features sensitivity, bidirectionality and privacy. Therefore, compared with visual and auditory channels, the haptic channel is more advantageous in providing feedback to the user on the understanding capability and task situation of external limbs, which can play a unique role in reducing the difficulty of human-robot interaction and creating highly immersive operation experience for the user.

(3) The present disclosure adopts a small wireless wearable design, where the main control device is integrated, and each module can be worn on the arm of the slave manipulator robot of the user in a modular split manner, such that the user can wear and remove it conveniently, and the human-robot formation system can be connected only by turning on the power.

It should be noted that the above content merely illustrates the technical idea of the present disclosure and cannot limit the protection scope of the present disclosure, those ordinarily skilled in the art may also make some modifications and improvements without departing from the principle of the present disclosure, and these modifications and improvements should also fall within the protection scope of the claims of the present disclosure.

What it claimed is:

1. A wearable haptic feedback device for human-robot formation control, comprising an interactive interface module and a main control module,
   wherein the interactive interface module comprises an input module and a wearable haptics feedback module; the wearable haptics feedback module comprises an extrusion force feedback module, a shear force feedback module, and a vibration feedback module, and all modules are worn on an arm of a slave manipulator robot of a user, and the main control module controls the extrusion force feedback module, the shear force feedback module, and the vibration feedback module, respectively, through a circuit module, and obtains state information of a human-robot formation system through a Bluetooth module,
   wherein the vibration feedback module is composed of a vibration motor array; 25 vibration motors form an array and are fixed on a flexible printed circuit board, and the user fixes the array on rear ends of his/her forearms and tie the array up until he/she feels that the motors are in contact with his/her skin; and feedback on information about formation change and travelling direction of the human-robot formation in the process is provided by providing different vibration modes and motor vibration in a specific orientation.

2. The wearable haptic feedback device for human-robot formation control according to claim 1,
   wherein the extrusion force feedback module is composed of servos and straps, telescopic arm bands for generating extrusion haptics feedback are connected to a rotating member, different extrusion forces are generated on the forearms of the user by controlling the rotation of the servos; when two servos rotate to tighten the straps at the same time, shrinkage of the arm bands increases the extrusion force acting on the forearms of the user, and the device is configured to provide feedback on team dispersion and contraction of the human-robot formation, and provide feedback on a team size of the human-robot formation in real time through contraction force of the arm bands.

3. The wearable haptic feedback device for human-robot formation control according to claim 1,
   wherein the shear force feedback module is composed of Direct Current (DC) speed reduction motors; four motors are fixed on arms of the user through printing members and the straps, friction wheels are installed at rotating shafts, and the motors drive rotation of the friction wheels to generate shearing force in front, rear, left and right directions on the arms of the user, so as to provide feedback on travelling direction guidance of the human-robot formation system.

4. The wearable haptic feedback device for human-robot formation control according to claim 2,
   wherein the extrusion force feedback module, a rotation angle of the servos and the pressure applied thereon have the following relationship:

$$N = \pi k \left( l_0 + 2R\sin\theta - \frac{R_0}{k}\sin\frac{\theta}{2} \right)$$

in the formula, N represents a magnitude of extrusion force, $\theta$ represents a rotation angle of the servos, k represents an elasticity coefficient of the straps, $R_0$ represents an original radius of the straps, and R represents radius of the arm.

5. The wearable haptic feedback device for human-robot formation control according to claim 1,
   wherein the 25 vibration motors are arranged in a 5×5 array at intervals of 12 mm apart from one another, and are fixed on the flexible Printed Circuit Board (PCB) to be directly connected to the main control module; the vibration motors are miniature flat rotor vibration motors, and a vibration intensity at a single position can be adjusted by adjusting an input voltage thereof; when the device is working, the output principle of the module is to refreshing row by row, that is, after receiving an instruction, the main control module executes the motor vibration state control at a certain period to generate corresponding continuous vibration feedback, which can produce haptic feeling of apparent motion on the skin surface of the user.

6. The wearable haptic feedback device for human-robot formation control according to claim 1,
   wherein the mainboard of the main control module uses L9110S chips and ULN 2803 chips for driving 4 speed reduction motors and the 25 vibration motors to work; and the mainboard is provided with a Bluetooth chip interface, and a wireless control device can work through Bluetooth serial port communication; and a 18650 lithium battery supplies power to the power supply, which then provides a 7.4 V stable voltage for the main control module and the haptics feedback module.

7. A working process of the wearable haptic feedback device for human-robot formation control according to claim 1, comprising the following steps:
   1) Information on the human-robot formation is obtained in real time and is transmitted to the main control module via Bluetooth wireless communication;
   2) The main control module screens out valid state information of the human-robot formation system according to the received information and classifies the state information;

the state information of the human-robot formation system can be divided into four categories: the team size of the human-robot formation, the travelling direction of the human-robot formation system, the formation change of the human-robot formation, and information on an obstacle near the human-robot formation;

3) The main control module drives the corresponding feedback module according to different state information of the robot;

when the team size of the human-robot formation changes, the main control module drives the extrusion force feedback module to control the servo to rotate and tighten the straps; when a team of the human-robot formation is dispersed, contraction force of the arm bands is increased; and when the team of the human-robot formation is contracted, the contraction force of the arm bands is decreased, such that feedback on the team size of the human-robot formation can be achieved in real time;

when the travelling direction of the human-robot formation system is changed, the main control module drives the shear force feedback module to control the standby, forward rotation, reverse rotation and braking of the four motors; when the human-robot formation system sends a forward guidance instruction, the motor located on a left side of the arm runs anticlockwise, and the motor located on a right side of the arm runs clockwise, such that the user feels the shearing force applied above the arm, providing guidance for the user to guide the robots to move forwards to some extent, and at the same time, feedback on a distance of the team of the human-robot formation relative to a target position is provided through rotation speeds of the motors;

when the human-robot formation system is subjected to the formation change, the main control module drives the vibration feedback module to control the vibration motors to vibrate in an orderly manner; and when the state formation of multi-mobile robots is changed from Ti to Tj, a corresponding vibration mode is designed for each formation change state: $Zd=f(Ti \rightarrow Tj)$ ($i \neq j$, i, j=1, 2, . . . , K); and when an obstacle is near the human-robot formation system, the main control module drives the vibration feedback module to control four vibration motors on an outer side of the vibration motor array to vibrate, such that feedback on information of the obstacle near the formation system is provided; and when an obstacle in one direction of the formation enters a critical distance, the vibration motors in the corresponding direction will vibrate to remind the user.

\* \* \* \* \*